United States Patent [19]
Ziethen et al.

[11] Patent Number: 5,295,624
[45] Date of Patent: Mar. 22, 1994

[54] CONTACT SURFACES OF A TRACK PART AND RAILWAY WHEEL

[75] Inventors: Ruediger Ziethen, Geranienweg; Erich Nuding, Linden; Sebastian Benenowski, Butzbach, all of Fed. Rep. of Germany

[73] Assignee: BWG, Butzbacher Weichenbau GmbH, Butzbach, Fed. Rep. of Germany

[21] Appl. No.: 836,656

[22] Filed: Feb. 18, 1992

[30] Foreign Application Priority Data

Jul. 26, 1991 [DE] Fed. Rep. of Germany ....... 9109278

[51] Int. Cl.$^5$ .................... B60B 17/00; E01B 5/00
[52] U.S. Cl. ........................... 238/125; 238/122; 238/148; 295/34; 104/306; 104/307
[58] Field of Search .................. 105/163.1, 163.2; 104/306; 238/122, 125, 148; 295/34

[56] References Cited

U.S. PATENT DOCUMENTS

| | | | |
|---|---|---|---|
| 1,420,389 | 6/1922 | Scott | 104/306 |
| 2,056,729 | 10/1936 | Leisner | 238/125 |
| 4,355,578 | 10/1982 | Raquet | 104/306 |
| 4,431,227 | 2/1984 | Howell | 104/306 |

FOREIGN PATENT DOCUMENTS

| | | |
|---|---|---|
| 206764 | 8/1984 | Fed. Rep. of Germany . |
| 4008299 | 7/1991 | Fed. Rep. of Germany . |
| 2410589 | 8/1979 | France ................. 104/306 |

OTHER PUBLICATIONS

"Railroad Track Mechanics & Technology", Arnold D. Kerr, Princeton University, N.J., 1978, Pergamon Press.

Primary Examiner—Mark T. Le
Attorney, Agent, or Firm—Beveridge, DeGrandi, Weilacher & Young

[57] ABSTRACT

To achieve low wear and hence a greater shape durability of track parts, it is proposed that the contact surface of a track part have a curvature having a constant difference $\Delta K$ in relation to the curvature of the corresponding current contact surface of the wheel supported on it, or that successive contact surfaces of the track part and the wheel have a continually changing curvature difference $\Delta K$ with the curvature difference between the contact surfaces of the track part and wheel lessening as the angle of contact tangent increases.

13 Claims, 4 Drawing Sheets

PART WITH CONSTANT CURVATURE DIFFERENCE IN DIFFERENT WHEEL POSITION

CURVATURE DIFFERENCE DELTA KAPPA AS A FUNCTION OF THE PART WIDTH

PART WIDTHS IN $\Delta \varkappa = 0.05, 0.1, 0.2$ und $0.3$

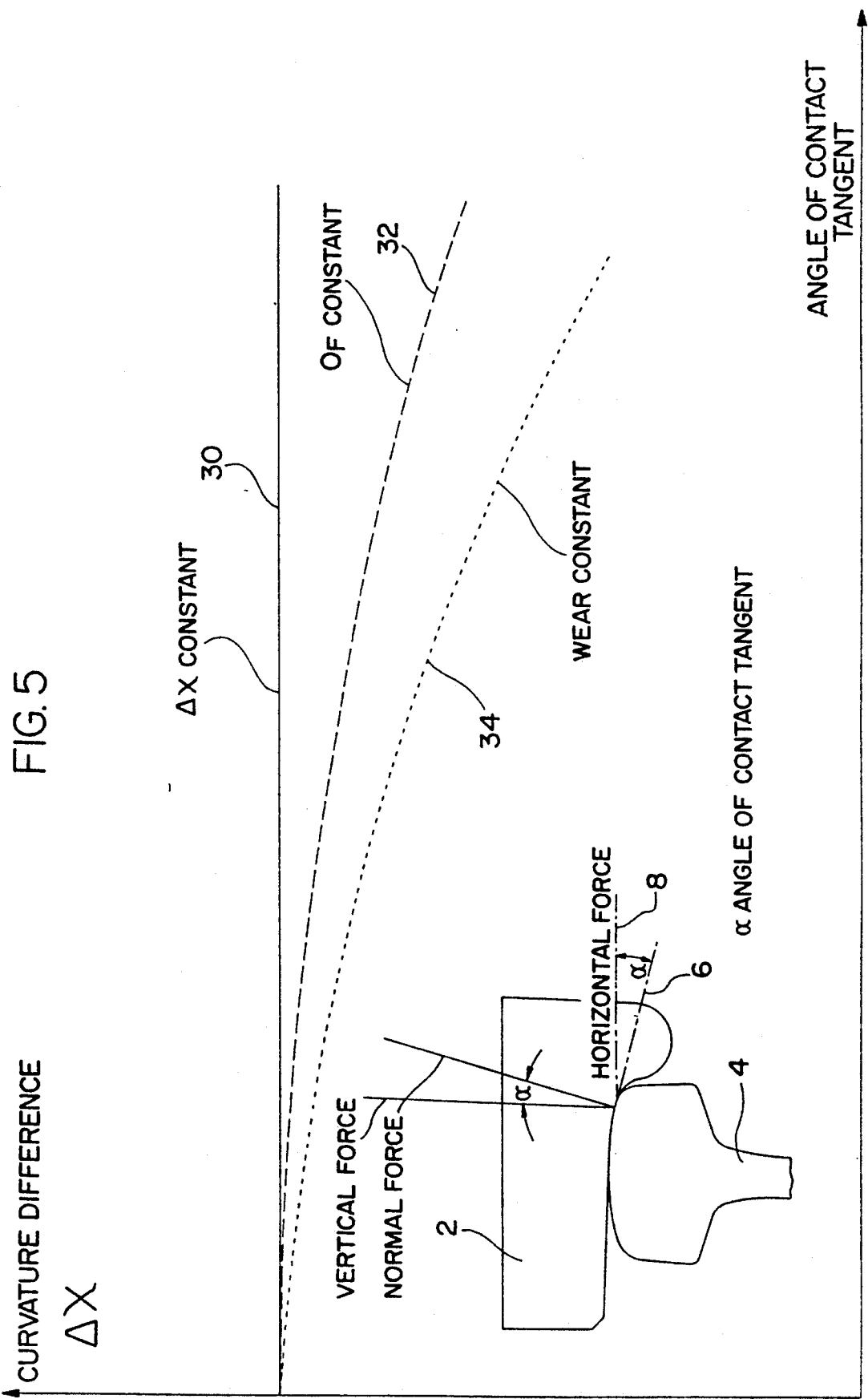

CONTACT SURFACES OF A TRACK PART AND RAILWAY WHEEL

FIELD OF THE INVENTION

The invention relates to contact surfaces of a track part such as a rail or points part and of a wheel of a railway vehicle travelling thereon, where the contact surfaces of the wheel have curvatures that preferably continually merge into one another.

BACKGROUND DISCUSSION

Wear on the wheel as well as on the rail, i.e. on its rail head, is influenced on the one hand by the materials used and on the other hand to a large extent by the shape of the wheel and the rail.

The rails used today—whether in standard track sections or, for example, in points and crossings—have rail heads that comprise three sections having abruptly changing radii in those areas in which they come into contact with the wheels of a railway vehicle travelling thereon. The flank-side section thus has a radius of 13 Mm, the following section a radius of 80 mm, and the section passing into the horizontal a radius of 300 mm. To these aforementioned abrupt changes in the curvature is allocated a wheel in which a continual change in the curvature takes place, with a curvature radius likewise of 13 mm being present in the area of the wheel flange interacting with the flank area of the rail. If there is a correspondence as regards the curvature and hence the curvature radii in this area, there are in all other areas divergences, that change abruptly.

In view of these geometries, the general principle must be based on a one-point, two-point and line contact between wheel and rail, depending on the rail curve, which determines the contact between wheel and rail head.

One-point contact is always whenever the curvature of the wheel is smaller than that of the rail at the respective contact angle (=angle between normal force and vertical=angle between wheel/rail contact tangent and horizontal). With this contact, a relatively low longitudinal slip results from the diameter difference between the current roll circles of the wheels in a wheel set and the brake force or traction force transmission. Since, however, load and guidance forces act together at one point, crushing yield points can be exceeded that might lead to damage and cracking both on the wheel and on the rail.

Two-point contact is determined by the separation of the wheel contact point and the wheel flange pressure point.

The greater part of the wheel load is effective in the wheel contact point, and the guiding force and parts of the wheel load in the wheel flange pressure point. Since a pure rolling motion of the wheel is only possible in one diameter, whereas the two-point contact involves differing diameters, sliding wear occurs at one point at least, whereas sliding occurs in the other contact point. The linear contact between wheel and rail occurs both from the one-point and the two-point contact, exceeding the crushing yield point continuing sliding wear.

When the respective contact surface between wheel and rail is considered, there are different contact surfaces in a straight section and a curved section, these surfaces being elliptical in form and therefor known as contact ellipses. The main axis of the contact ellipses is therefore always of the same magnitude, since a section of the wheel following a circle is supported on the surface of the rail that is flat when viewed in the longitudinal direction. However, the short half-axis, i.e. the transverse axis, changes as a function of the wheel position in relation to the rail head. However, the smaller the short axis is, the higher the surface pressure and hence the load. The result is an undesirable wear that leads, in particular in the case of the rail, to a geometry change that makes renewal necessary.

SUMMARY OF THE INVENTION

The problem underlying the present invention is to achieve a more stable geometry, i.e. a higher durability of the rail shape.

The object is substantially attained in accordance with the invention in that the respective contact surface of the rail has a curvature that has a constant difference in relation to the curvature of the current contact surface of the wheel supported on it, or that successive contact surfaces of the rail and the wheel have a continually changing curvature difference. The curvature of the contact surface of the wheel is here always less than the corresponding contact surface of the rail.

The invention is based on the fact that the contact surfaces between wheel and rail depend, on the one hand, on the vehicle movement and the axle load, and, on the other hand, on the geometric design of the wheel, so that the only degree of freedom is the possibility of changing the shape and strength of the rail or of the respective rail section. This was a move away from the idea that the rail profile must have the familiar abruptly changing curvatures in the rail head area. Instead, the geometry of the rail head is adapted to the curvature of the wheel, in which the radius continually changes. To achieve a full-surface contact at the same time, i.e. to ensure a contact ellipse, the secondary condition that the curvature radius of the contact surface of the wheel must always be greater than the corresponding contact surface of the rail has been set. p In an embodiment of the invention, the curvature difference changes as a function of the contact angle (=angle between normal force and vertical=angle between wheel/rail contact tangent and horizontal) of the wheel. This means that the curvature difference between wheel and rail is not constant, but changes continually.

To achieve a substantially constant surface pressure or reduced stress between wheel and rail, the curvature difference is provided as a function of the contact angle, where the curvature difference decreases as the contact angle increases. This change in the curvature difference has in the contact ellipse the effect that the small half-axis increases. As a result of the growing area of the contact ellipse, the surface pressure is not increased in spite of the growing normal load, i.e. the pressure remains constant or substantially constant.

Since wear is due to both sliding and pressure, optimization is possible in this respect by having the curvature difference reduced even further as a function of the contact angle, i.e. the short half-axis of the contact ellipse becomes even greater as the contact angle increases, meaning that the surface pressure decreases as the sliding action increases, with the result being that the wear is identical or almost identical regardless of the contact angle.

If the curvature differences are to be identical, the rail components are shaped such that at each wheel/rail contact point, has on the one hand, the tangents of both parts parallel and, on the other hand, the short half-axes of the contact ellipses always the same width.

BRIEF DESCRIPTION OF THE DRAWINGS

Further details, advantages and features of the invention can be found not only in the claims and in the features stated therein—singly and/or in combination—but also in the following description of an embodiment shown in the drawing.

In the drawings,

FIG. 5 shows a further diagram in which the curvature difference is plotted over the angle of the contact tangent.

DETAILED DESCRIPTION OF THE PREFERRED EMBODIMENTS

Figure 1:
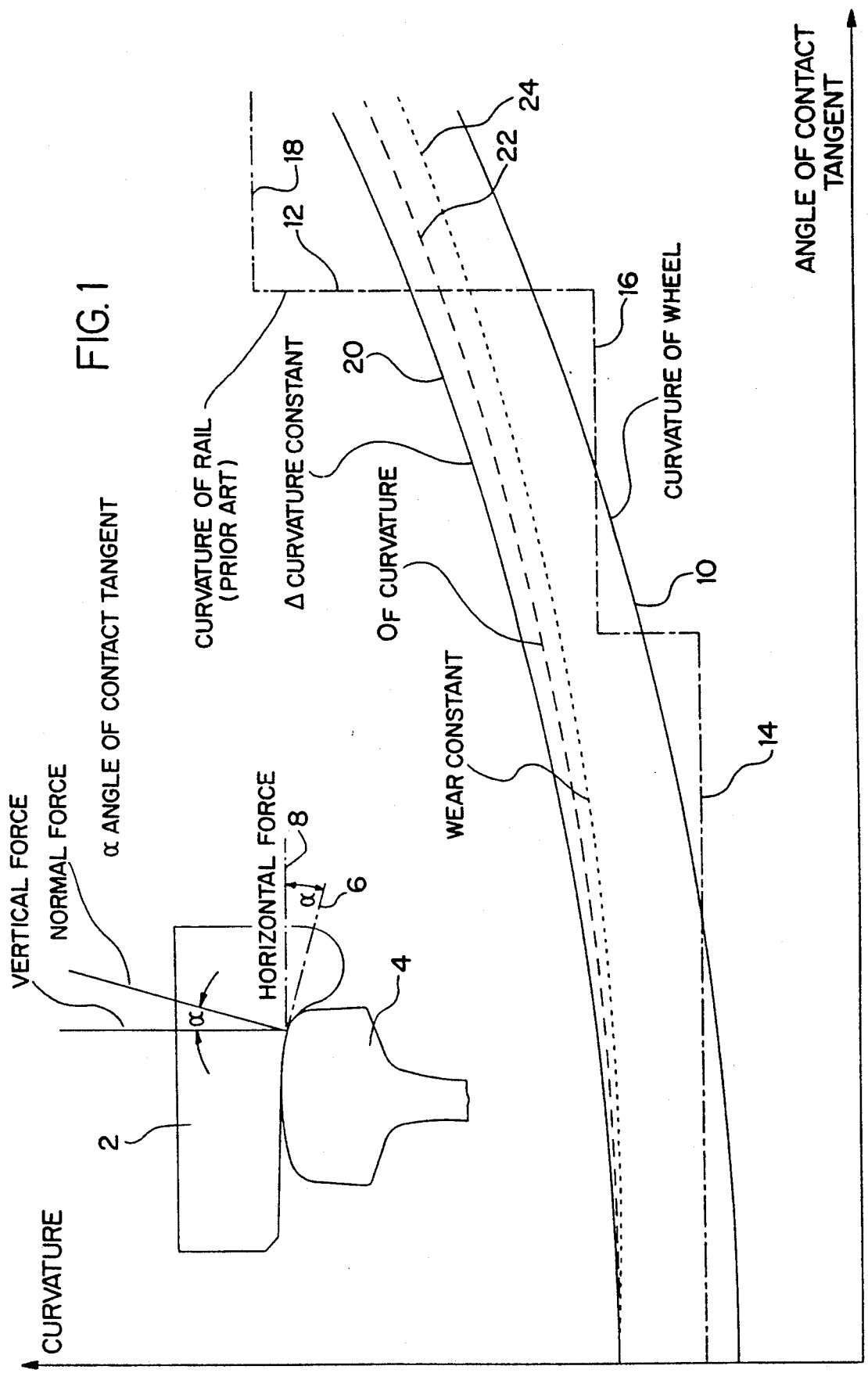
FIG. 1 shows a diagram in which the curvature in relation to the wheel contact angle is plotted.

The difference between the theory in accordance with the invention and the prior art is made clear in FIG. 1.

The graph shows the curvature in relation to the angle of the contact tangent, i.e. the contact angle between wheel and track part (in the following referred to as rail for simplicity's sake), i.e. the rail head.

As the section of wheel (2) and rail head (4) shown in the graph makes clear, the wheel contact angle $\alpha$ is equal to the angle between the contact tangent (6) between the wheel (2) and rail head (4) and the horizontal (8) or between the horizontal force and the contact tangent (6).

Accordingly, angle $\alpha$ is also the angle between the vertical force and the normal force.

It is also clear that the greater angle $\alpha$ is, the greater the resultant force in the flank area of the rail head.

The lower continuous line (10) shows the curvature of the contact surface of the wheel (2), in which a continual change in the curvature can be noted as the wheel contact angle $\alpha$ increases.

According to the prior art, a corresponding wheel (2) with continually changing curvature travels over a rail whose curvature changes abruptly. This is shown by the dash-dotted line (12). It is clear that the curvature difference in some areas changes discontinuously as a function of the wheel contact angle $\alpha$ between wheel and rail, with the curvature and hence the curvature radius of the wheel in some sections being greater than that of the rail and vice versa. The plateau (14) at the coordinate origin corresponds to the curvature radius of 300 mm, the following plateau (16) to the curvature radius of 80 mm, and the third plateau (18) to the curvature radius of 13 mm of the rail head.

Figure 4:
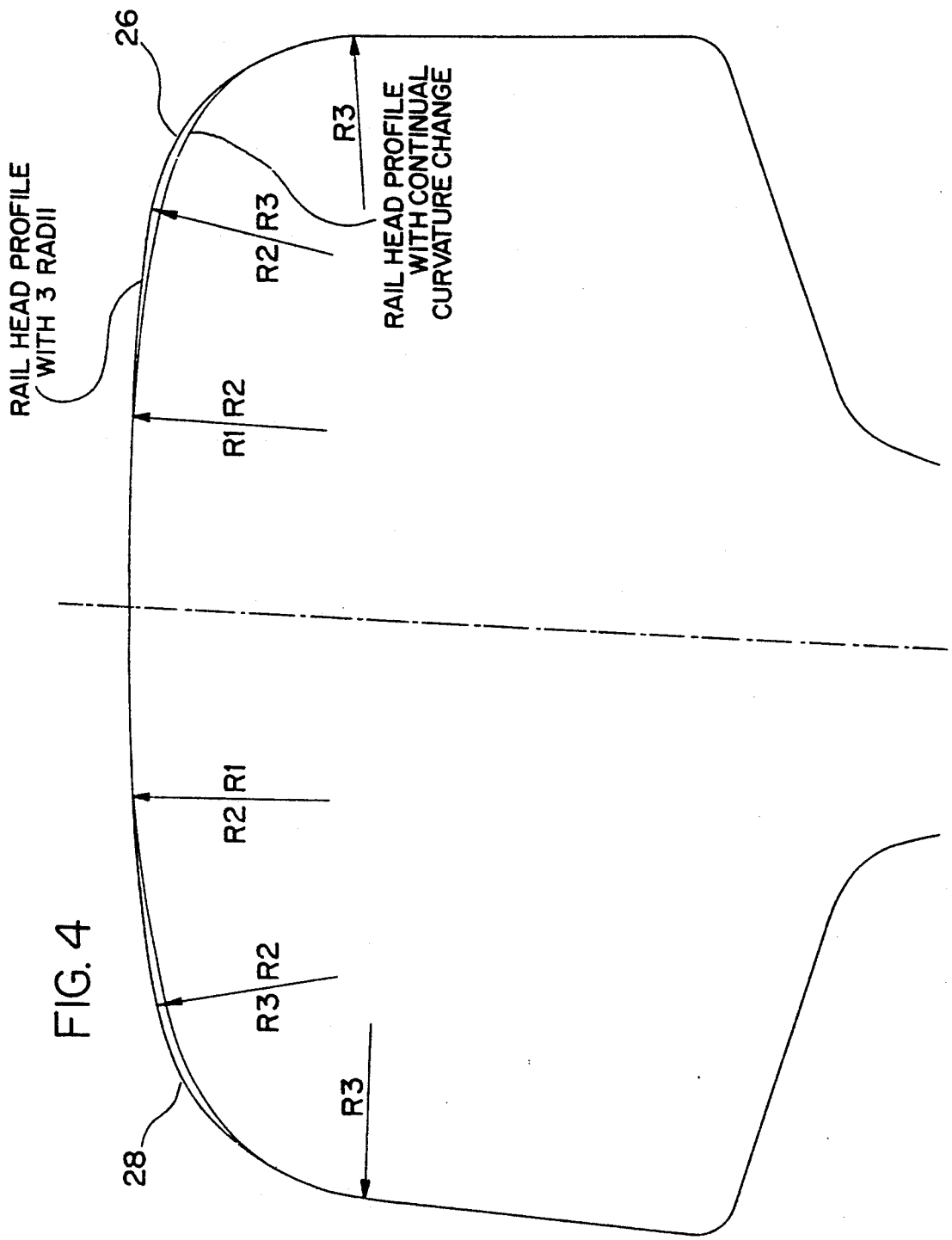
FIG. 4 shows different rail heads.

A rail head with curvatures changing with corresponding abruptness is shown purely in principle in FIG. 4, and referenced (26). The different curvatures and hence radii are designated R1, R2 and R3.

It is now proposed in accordance with the invention that the curvature of that area of the rail head interacting with the wheel be continually changed, to the extent as shown in FIG. 1 that a constant curvature difference between wheel and rail as shown in the continuous left-hand line (20) is obtained in the respective contact surface along the rail head when viewed in a plane vertical to the longitudinal axis of the rail.

The continuous left-hand line (20) is intended to show the respective curvature of the rail on a purely qualitative basis. Between the lines (10) and (20), the curvature difference $\Delta K$ (in the dimension unit 1/cm) should always be identical while the angles of the contact tangents differ, i.e. with differing wheel contact angles $\alpha$.

If it must be ensured that the surface pressure $\sigma_F$ must be identical at all times, i.e. independent of the actual wheel contact angle, the curvature difference must decrease as the angle increases. This is indicated by the dashed line (22) in FIG. 1.

FIG. 4 shows purely in principle a rail head (28) based on the theory in accordance with the invention, in which the curvature continually changes.

Finally, FIG. 5 plots the curvature difference $\Delta K$ in relation to angle $\alpha$, i.e. to the angle between the contact tangent (6) and the horizontal (8). The continuous line (30) parallel to the abscissa corresponds to a constant curvature difference $\Delta K$. If the surface pressure $\sigma_F$ has to be constant, the curvature difference $\Delta K$ must decrease as the angle $\alpha$ increases. The corresponding line is referenced as (32).

Finally, if it is the wear that must remain constant, the curvature difference $\Delta K$ must be decreased even further as angle $\alpha$ increases (line (34), FIG. 5), since the surface pressure $\sigma_F$ has to be reduced while the sliding action increases at the same time.

With the curvature difference continually increasing to a higher extent, there is accordingly a constant wear ensuring shape durability. This is shown in FIG. 1 by the dotted line (24).

Figure 2:
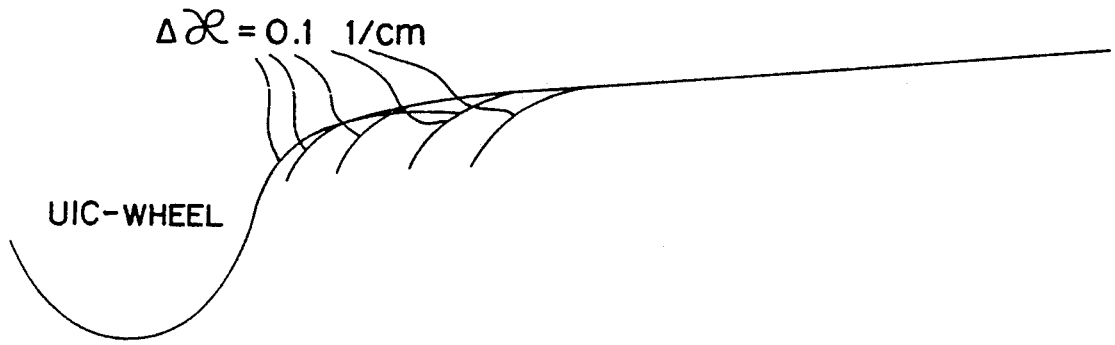
FIG. 2 shows sections of rail parts that in differing rail positions have curvature differences in their contact surfaces that are constant in relation to wheels travelling over these rail parts.
Figure 3:
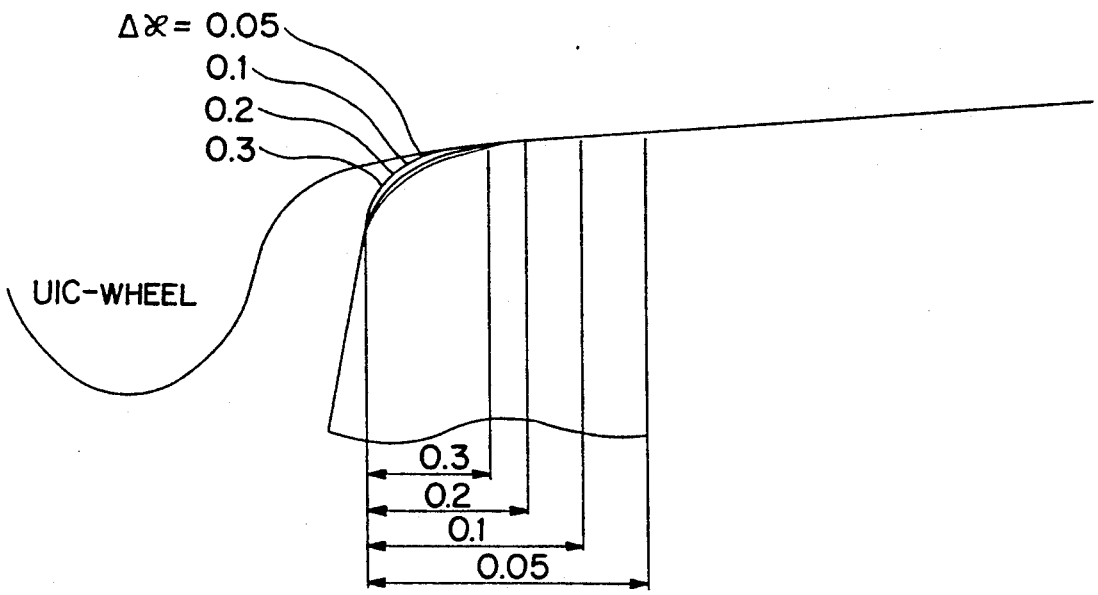
FIG. 3 shows sections of rail parts of differing widths and differing curvature differences in relation to wheels travelling over these rail parts.

FIGS. 2 and 3 show different rail contours with different curvature radii. FIG. 2 shows a points section (rail, tongue, frog tip) in different positions in relation to the wheel, with the curvature difference in all contact points being identical in size, i.e. $\Delta K = 0.1$ 1/cm.

FIG. 3 makes clear that parts of different width also necessitate differing curvature differences. The conclusion that must be drawn is furthermore that different construction widths necessitate different materials in order to avoid undesirable wear in the case of low construction widths.

The curvature difference $\Delta K$ is preferably between 0.01 and 0.5, with the former value 0.01 applying for a track with normal full rail head, and 0.05 for rail parts in the frog and tongue areas.

The theory in accordance with the invention is particularly suited for rails in the form of points sections, in order to achieve service life and wear conditions matching those of the track. This is achieved in particular by shaping the component geometries such that the same load occurs at a cross-section in every wheel position, with the material properties being such that there is no permanent deformation when the parts are traversed by rolling stock. The component geometry is the result of the curvature differences of the contact surfaces currently on top of one another between wheel and part being identical, or in the case of successive contact surfaces being continually changed, in order to achieve in particular a constant surface pressure.

We claim:

1. A track part and a railway wheel combination comprising:

a railway wheel having a pre-wear contact surface with a continually changing curvature across a width thereof;

a track part having a pre-wear contact surface adapted for contact with the continually changing curvature of said railway wheel so as to form an angle of contact at contacting points of said contact surfaces, each said angle of contact being defined by an angle that forms between a normal force vector and a vertical force vector of a contact force that develops at the contacting point of said contact surface of said track part;

said contact surface of said track part having a width-wise continually changing curvature, and said contact surfaces being dimensioned such that a constant curvature difference is maintained between said contacting surfaces as a function of the angles of contact along the width-wise continually changing curvature of the rail contact surface, and wherein said constant curvature difference is equal to a value other than zero.

2. A combination as recited in claim 1 wherein the contact surface of said railway wheel has a radius of curvature always greater than a radius of curvature of a corresponding current contacting surface of said track part.

3. A combination as recited in claim 2 wherein said track part is a points tongue.

4. A combination as recited in claim 2 wherein said track part is a frog tip.

5. A combination as recited in claim 1 wherein said track part is a points tongue.

6. A combination as recited in claim 1 wherein said track part is a frog tip.

7. A combination according to claim 1 wherein respective contact surfaces of said railway wheel and track part forms a contact ellipse during travel of said railway wheel on said track part, and wherein a respective track part section is shaped such that a short half-axis of said contact ellipse running vertical to a longitudinal axis of the track part is essentially of a common size regardless of track part width.

8. A combination according to claim 1 wherein said curvature difference is between 0.01 and 0.5 1/cm 9. A track part and a railway wheel combination, comprising:

a railway wheel having a contact surface with a continually changing curvature across a width thereof;

a track part having a contact surface adapted for contact with the continually changing curvature of said railway wheel so as to form an angle of contact at contacting points of said contacting surfaces, each said angle of contact being defined by an angle that forms between a normal force vector and vertical force vector of a contact force that develops at the contacting point of said contact surface of said track part;

said contact surface of said track part having a width-wise continually changing curvature, and said contact surfaces being dimensioned such that a curvature difference exists between the curvature of the contacting surfaces as a function of the angle of contact, and such that the curvature difference between the contacting surfaces decreases as the angle of contact increases.

10. A combination as recited in claim 9 wherein said track part is a points tongue.

11. A combination as recited in claim 9 wherein said track part is a frog tip.

12. A track part for use with a railway wheel, the railway wheel having a pre-wear contact surface with a width-wise continually changing curvature, said track part having a pre-wear contact surface adapted for contact with the pre-wear contact surface of the railway wheel so as to form an angle of contact at contacting points of said contact surfaces, each said angle of contact being defined by an angle that forms between a normal force vector and a vertical force vector of a contact force that develops at the contacting point of said contact surface of said track part, said contact surface of said track part having a width-wise continually changing curvature, and said contact surface of said track part being dimensioned such that there exists curvature differences between the contacting curvatures of the wheel and said track part for differing angles of contact between said contact surfaces, and said curvature differences ranging from a constant curvature difference for all angles of contact between the contact surfaces to curvature differences which decrease as the angle of contact increases, and wherein all of said curvature differences being equal to a value other than zero.

13. A track part as recited in claim 12 wherein said curvature difference remains a constant curvature difference for all angles of contact between the contact surfaces.

* * * * *